(12) United States Patent
Sugimoto

(10) Patent No.: US 6,357,828 B1
(45) Date of Patent: Mar. 19, 2002

(54) SEAT RECLINING APPARATUS WITH VIBRATION SOUND INSULATION

(75) Inventor: Kunihisa Sugimoto, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/450,756

(22) Filed: Nov. 30, 1999

(30) Foreign Application Priority Data

Nov. 30, 1998 (JP) ............................................ 10-338292

(51) Int. Cl.[7] ................................................ B60N 2/02
(52) U.S. Cl. ...................................... 297/365; 297/367
(58) Field of Search ................................ 297/365, 366, 297/367, 368, 369, 362, 363, 364

(56) References Cited

U.S. PATENT DOCUMENTS

| | | | |
|---|---|---|---|
| 4,541,672 A | * 9/1985 | Fukuta et al. | 297/367 |
| 5,664,837 A | * 9/1997 | Takagi | 297/367 |
| 5,749,624 A | * 5/1998 | Yoshida | 297/367 |
| 5,813,724 A | * 9/1998 | Matsuura et al. | 297/365 X |
| 5,857,746 A | * 1/1999 | Barrere et al. | 297/367 |
| 5,873,630 A | * 2/1999 | Yoshida et al. | 297/367 |
| 6,023,994 A | * 2/2000 | Yoshida | 297/367 X |

FOREIGN PATENT DOCUMENTS

| | | |
|---|---|---|
| JP | 2-193606 | 7/1990 |
| JP | 7-87802 | 9/1995 |
| JP | 10-71040 | 3/1998 |

* cited by examiner

Primary Examiner—Jose V. Chen
Assistant Examiner—Stephen Vu
(74) Attorney, Agent, or Firm—Foley & Lardner

(57) ABSTRACT

A seat reclining apparatus has a pair of base plates adapted to be secured to a seat cushion; a pair of arm plates adapted to be secured to a seat back, for allowing a pivotal movement of the seat back, an interlocking shaft for allowing a pivotal movement of the pair of arm plates at substantially the same time relative to the pair of base plates; a link plate formed on the interlocking shaft, the link plate having an opening; a sound-insulating member attached to the link plate, the sound-insulating member having an opening and an inside edge defined by the opening thereof, the inside edge projecting inwardly of an inside edge defined by the opening of the link plate; and a pin connected with one of the arm plates and disposed through the opening of the link plate such that the pin is allowed to sound attenuatingly abut against the inside edge of the sound-insulating member when the link plate is rotated by the interlocking shaft.

6 Claims, 5 Drawing Sheets

SEAT RECLINING APPARATUS WITH VIBRATION SOUND INSULATION

BACKGROUND OF THE INVENTION

1. Field of the Invention

The present invention relates to a seat reclining apparatus, and more particularly to a seat reclining apparatus that is capable of insulating an uncomfortable sound which may be caused by a vibration during vehicle running.

2. Description of the Prior Art

Hitherto, various types of seat reclining apparatuses have been proposed and put into practical use particularly in the field of motor vehicles in order to secure a good driver's seating condition.

Each seat reclining apparatus has a pair of seat reclining devices, one of which is provided on the right side of the seat cushion and the other of which is provided on the left side of the seat cushion. For interlocking the pair of seat reclining devices, an operation lever is disposed on either the right side or the left side of the seat cushion.

Japanese Patent Unexamined Publication JP 10-71040 discloses a seat reclining apparatus. In this apparatus, a pair of a first and a second link plates are secured to both ends of an interlocking shaft. The interlocking shaft is substantially orthogonal to the link plates. A pin is projectively disposed at a substantially end portion of the operation lever, and passes through an elongate opening of the first link plate. Another pin projects through a cam member and an elongate opening of the second link plate.

However, there used to occur the following uncomfortable sounds that are attributable to vibrations during vehicle running: A sound caused by an abutment of the pin against the inside edge of the elongate opening of the link plate. In addition, a sound caused by the operation lever that occurs when the operation lever is returned after it has been lifted up.

SUMMARY OF THE INVENTION

It is, therefore, an object of the present invention to provide a seat reclining apparatus that is capable of insulating vibration sound.

According to the present invention, there is provided a seat reclining apparatus which comprises a pair of base plates adapted to be secured to a seat cushion; a pair of arm plates adapted to be secured to a seat back, for allowing a pivotal movement of the seat back; an interlocking shaft for allowing a pivotal movement of the pair of arm plates at substantially the same time relative to the pair of base plates; a link plate formed on the interlocking shaft, the link plate having an opening; a sound-insulating member attached to the link plate, the sound-insulating member having an opening and an inside edge defined by the opening thereof, the inside edge projecting more inwardly than an inside edge defined by the opening of the link plate; and a pin for allowing one of the arm plates to pivot by a movement of the pin, the pin being disposed to pass through the opening of the link plate such that the pin is allowed to abut against the inside edge of the sound-insulating member when the link plate is rotated by the interlocking shaft.

DESCRIPTION OF THE PREFERRED EMBODIMENTS

Figure 1:
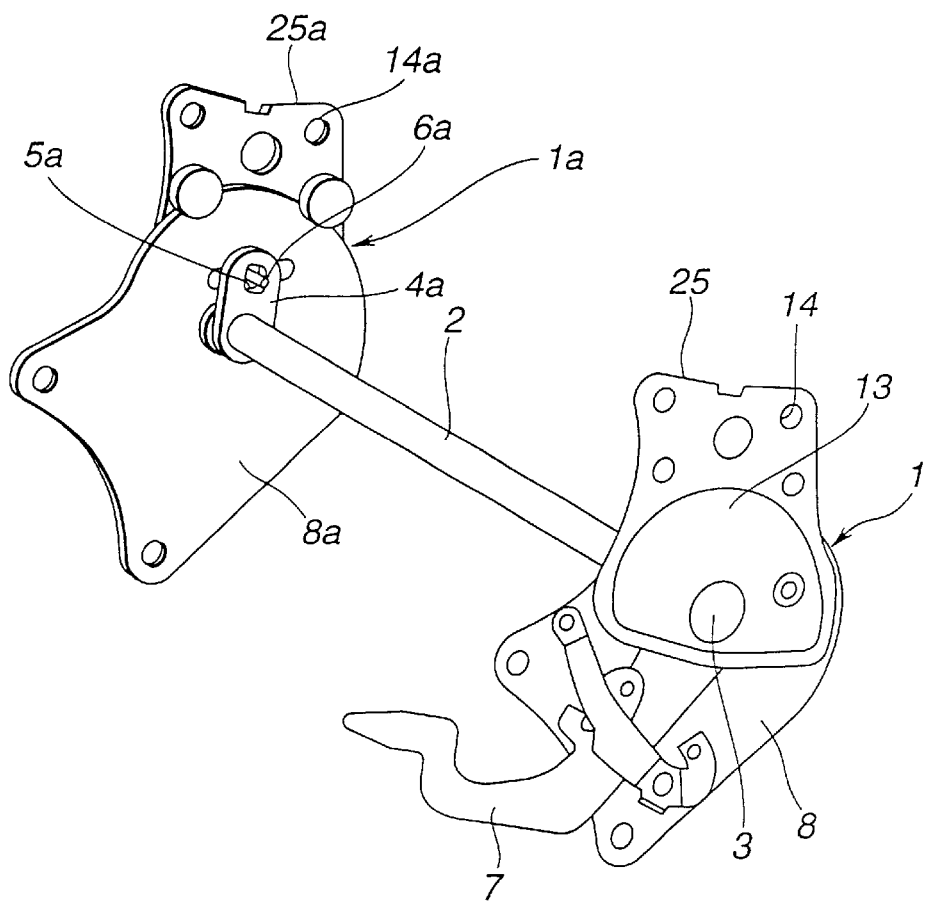
FIG. 1 is a perspective view showing a seat reclining apparatus according to a first preferred embodiment of the present invention.

As is seen in FIG. 1 through FIG. 7, there is provided a seat reclining apparatus, according to the first preferred embodiment of the present invention.

This apparatus has a pair of a first seat reclining device 1 and a second seat reclining device 1a, and an interlocking shaft 2 which is interposed therebetween. These reclining devices are partially symmetrical with each other.

Under the first preferred embodiment, in principle, any parts that belong to the second seat reclining device 1a are to be tailed by the alphabet "a" after the number thereof in order to distinguish them from their counterparts that belong to the first seat reclining device 1.

Furthermore, the first seat reclining device 1 and the second seat reclining device 1a are substantially similar in construction to each other. Therefore, description on one seat reclining device will be made with the aid of the other seat reclining device. However, in case it is necessary to distinguish them, description on one seat reclining device will be made independently of the other seat reclining device; e.g., description in relation to an operation lever will be made based on the first seat reclining device only.

The interlocking shaft 2 is, at both ends thereof, engaged with a pair of center hinge shafts 3 and 3a of the first seat reclining device 1 and the second seat reclining device 1a. The interlocking shaft 2 is a pipe that is rotatable relative to the center hinge shafts 3 and 3a, and has at both ends thereof a pair of link plates 4 and 4a each of which is coupled substantially orthogonally with the interlocking shaft 2 through a welding method or the like (see FIG. 3).

Figure 2:
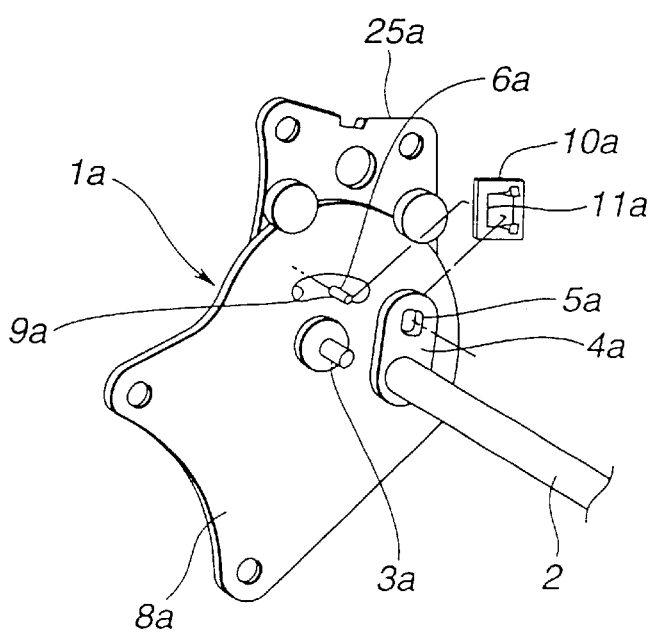
FIG. 2 is an exploded view showing a part of FIG. 1 and a sound-insulating member of the invention.

As is seen in FIGS. 1 and 2, a through opening 5a which is elongate in shape is disposed in the vicinity of the end of the link plate 4a. A pin 6a is disposed to pass through the through opening 5a. In the case of the first seat reclining device 1, the pin 6 is projectively fitted to a cam member 19 which is a part of a locking mechanism for locking the pivotal movement of an arm plate 25 relative to a base plate 8 corresponding thereto. Likewise, in the case of the second seat reclining device 1a, the pin 6a is projectively fitted to another or second cam member (not shown per se). The pin 6a is allowed to project from a through opening 9a of the base plate 8a and the through opening 5a of the link plate 4a.

A sound-insulating member 10 is fitted to the link plate 4 in a manner to surround the through opening 5 of the link plate 4. As is seen in FIG. 3 through FIG. 6, the sound-insulating member 10 is provided with inside edge 11-I which is a little more inwardly projective than inside edge of the through opening 5 of the link plate 4. The sound-insulating member 10 is an elastic member which is made of a synthetic resin or the like. The sound-insulating member 10 is one-piece in construction and has a pair of acute-headed projections 12. The acute-headed projections 12 are opposed to each other and extend from portions adjacent to a sound-insulating opening 11. Each of the acute-headed projections 12 is shaped like a half-arrow, which is allowed to be engaged with the through opening 5 by pressing the acute-headed projection 12 into the through opening 5.

Figure 3:
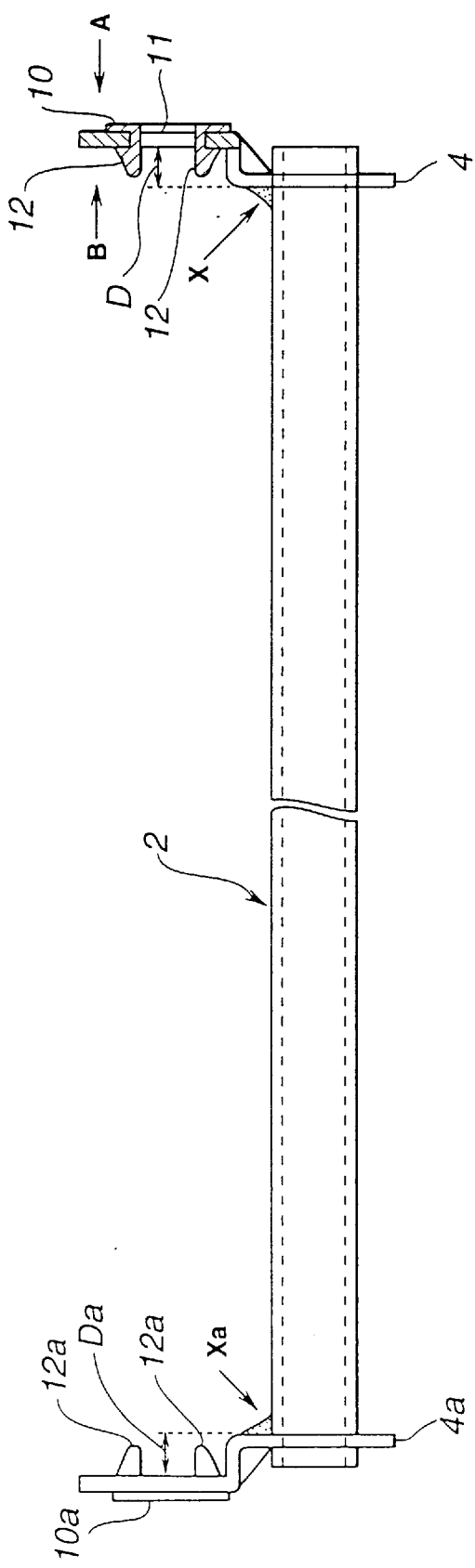
FIG. 3 is a partly sectioned front view showing an interlocking shaft.
Figure 4:
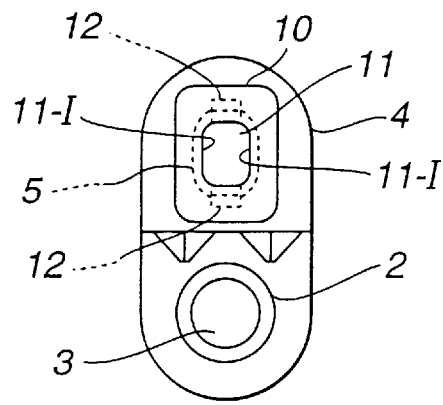
FIG. 4 is a view taken along arrow A in FIG. 3.
Figure 5:
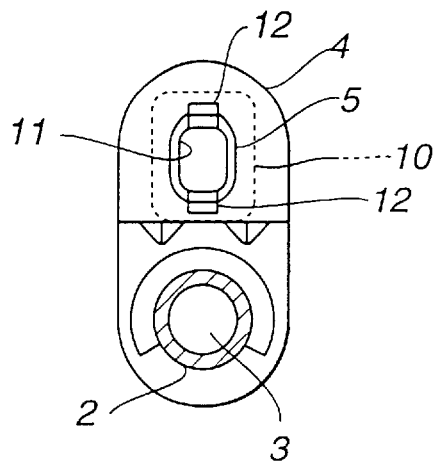
FIG. 5 a view taken along arrow B in FIG. 3.
Figure 6:
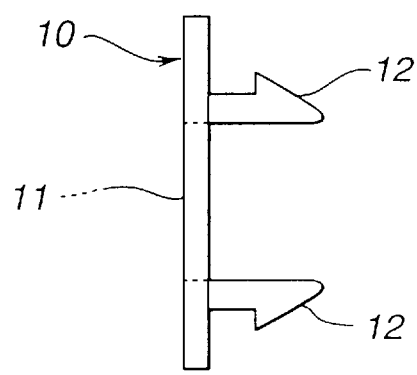
FIG. 6 is a side view of the sound-insulating member.

Each link plate 4 or 4a shown in FIG. 3 is a modification of that shown in FIGS. 1 and 2. In fact, an offset D is defined in FIG. 3, which is formed by shifting outward an upper half portion of the link plate 4. The link plate 4 is fixed to the interlocking shaft 2 at a welding portion X. With this, the upper half portion of the link plate 4 can become nearer to the surface of the base plate 8, thus reducing a torque which is applied to the pin 6.

When the pin 6 rotates the link plate 4 by turning the operation lever 7 of the first seat reclining device 1, the counterpart pin 6a of the link plate 4a of the second seat reclining device 1a moves in the through opening 9a, thereby to turn the second cam member (not shown). With this, the second seat reclining device 1a can be interlocked with the first seat reclining device 1. In this operation, the pin 6 at first abuts against the inside edge 11-I of the sound-insulating member 10. After this, the inside edge 11-I may be bent. Then, the pin 6 may abut against the edge of the through opening 5, thus rotating the link plate 4.

Figure 7:
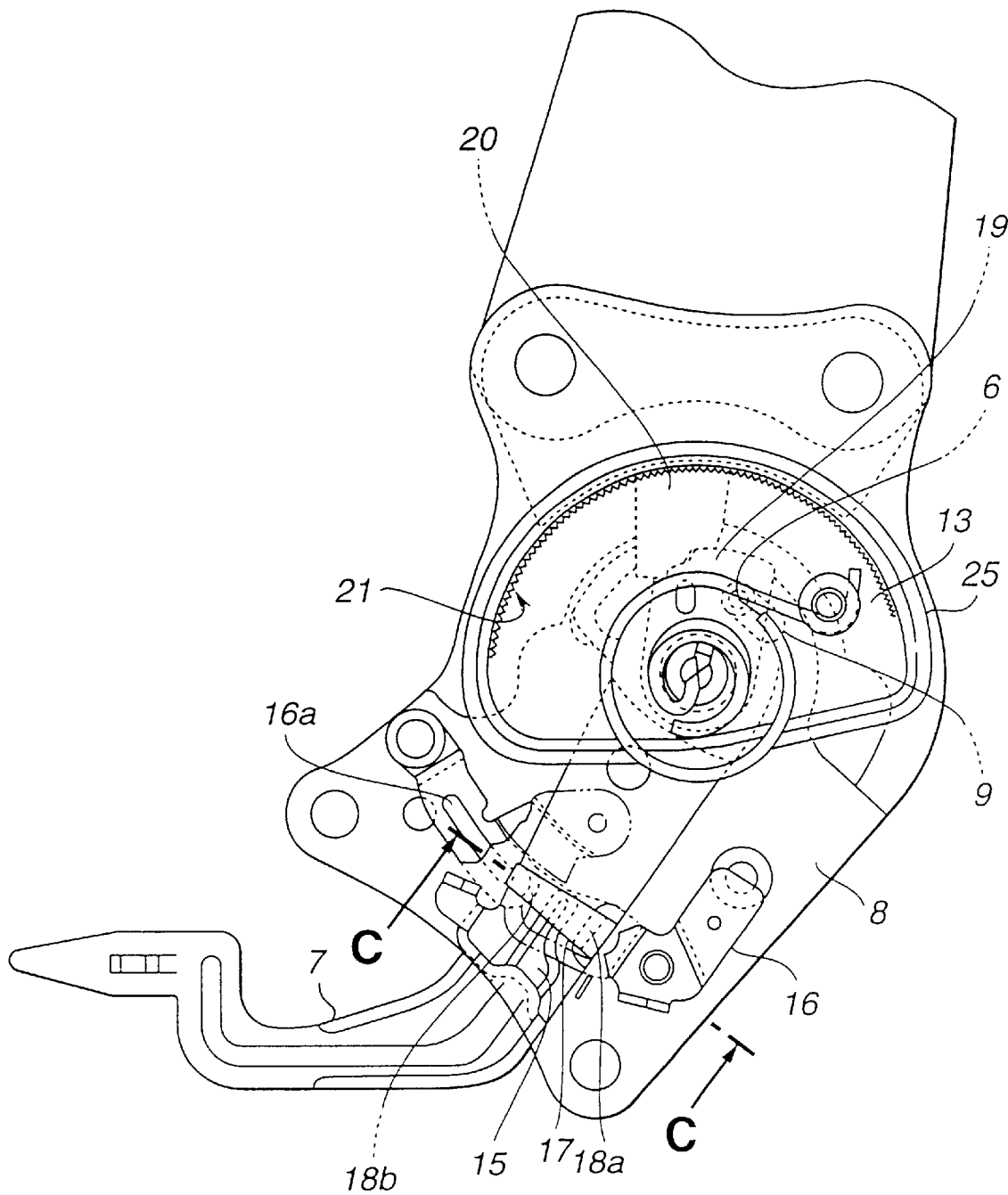
FIG. 7 is an enlarged elevational view of a seat reclining device of the apparatus.

As is seen in FIG. 7, after the operation lever 7 is turned, the cam member 19 allows a tooth piece 20 of the first seat reclining device 1 to slide. On the other hand, the second cam member of the second seat reclining device 1a allows a tooth piece 20a of the seat reclining device 1a to slide with a timing shifted from that of the tooth piece 20 for preventing an incomplete-locking (half-locking), wherein the second cam member is turned by the pin 6a which passes through the through opening 5a.

The arm plate 25 is pivotably secured to the base plate 8 by the center hinge shaft 3. When the tooth piece 20 slides, the tooth piece 20 is disengaged from an arcuate tooth portion 21 which is formed in an embossed portion 13 of the arm plate 25. Under this condition, the arm plate 8 can be tilted. A seat back (not shown) is coupled with a pair of arm plates 25 and 25a via bolts (not shown) passing through openings 14 and 14a of the arm plates 25 and 25a. The seat back can be tilted under the above condition in both clockwise and counter-clockwise directions so that a seat occupant can adjust the seat back to the best seat reclining condition.

It is an abutment between the pin 6 (metal) and the inside edge 11-I of the sound-insulating opening 11 (synthetic resin), instead of between the link plate 4 (metal) and the inside edge portion of the through opening 5 (metal), that occurs when the interlocking shaft 2 is vibrated during vehicle running. Therefore, the sound that may be caused by such vibration can be insulated.

In addition to the above-mentioned sound insulation using the sound-insulating member 10, another sound insulation is to be described hereinafter, which is the second preferred embodiment of the present invention.

Figure 8:
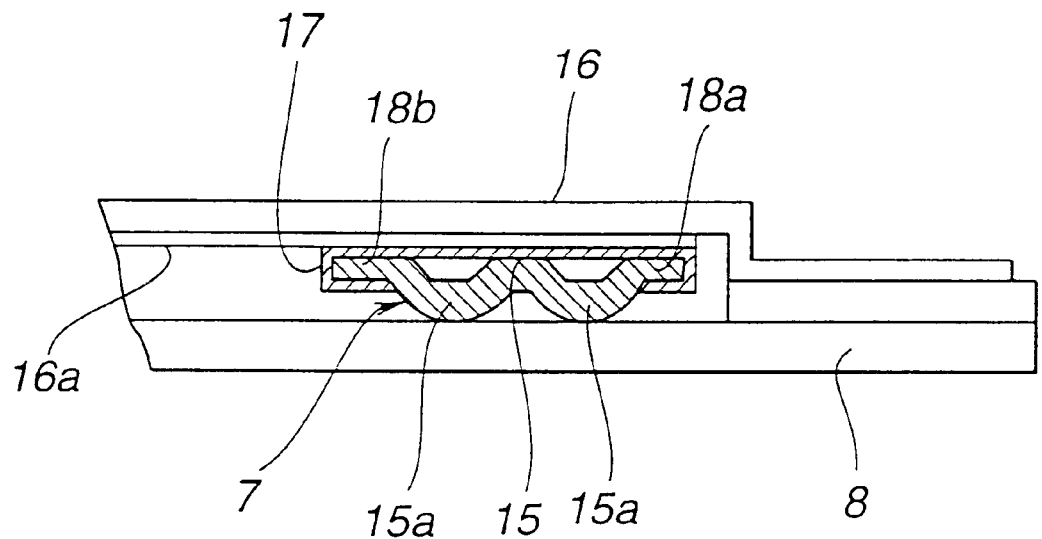
FIG. 8 is a cross section taken along lines C—C in FIG. 7, showing a sound-insulating member according to a second preferred embodiment of the present invention.

As is seen in FIG. 7 and FIG. 8, a thin metal plate of the operation lever 7 is reinforced with ribs 15, 15a, 18a and 18b which are bent to form two stages. For sustaining the operation lever 7, a lever bracket 16 is disposed on the base plate 8, such that the ribs 15, 18a and 18b projecting upwardly on an upper surface of the base plate 8 can slidably abut against the rib 16a which projects downwardly on a lower surface of the lever bracket 16, and that the rib 15a projecting downwardly on a lower surface of the lever bracket 16 can slidably abut against the upper surface of the base plate 8.

With this, a vibration caused by vehicle running is insulated, thereby to insulate sound. However, there are two points to be solved: When the ribs 18a and 18b abut too strongly against the lower surface of the rib 16a, it may become difficult to turn the operation lever 7. On the other hand, when the ribs 18a and 18b abut too lightly against the lower surface of the rib 16a, a vibration sound may occur.

Figure 9:
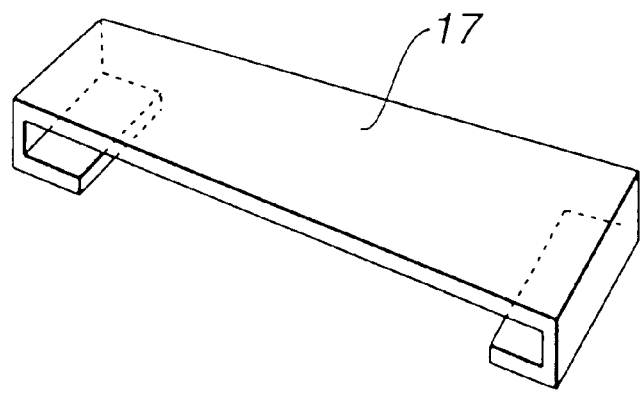
FIG. 9 is a perspective view of the sound-insulating member shown in FIG. 7.

As is seen in FIG. 7 and FIG. 8, according to the second preferred embodiment of the present invention, a sound-insulating member 17 is interposed as a spacer between the operation lever 7 and the rib 16a. The sound-insulating member 17 is made of synthetic resin and has a cross section formed like an elongate rectangular "C" as shown in FIGS. 8 and 9. The sound-insulating member 17 is, at both ends thereof, engaged with both the ribs 18a and 18b. In other words, the sound-insulating member 17 is fitted to the operation lever 7 such that the sound-insulating member 17 covers the ribs 15, 18a and 18b in the transverse direction.

It is preferable that the sound-insulating member 17 covers the operation lever 7 in the area covered with the lever bracket 16. Since the sound-insulating member 17 has a cross section formed like an elongate rectangular "C", as is seen in FIG. 9, and is made of synthetic resin, it is easy to fit the sound-insulating member 17 to the operation lever 7. That is, the sound-insulating member 17 can be fitted to the operation lever 7 in a manner to warp both ends of the sound-insulating member 17 such that both rectangular ends are brought into engagement with the ribs 18a and 18b.

Once the sound-insulating member 17 is fitted to the operation lever 7, any sound which may occur during vehicle running can be insulated for the following cause: The sound-insulating member 17 abuts against the inside surface of the lever bracket 16, which is resin-metal abutment, instead of metal-metal abutment.

The use of synthetic resin for insulating the sound during vehicle running has led to a simplified and cost-saving solution, without the need of measures to revise the entire mechanism of the seat reclining apparatus.

What is claimed is:

1. A seat reclining apparatus, comprising:
   a pair of base plates adapted to be secured to a seat cushion;
   a pair of arm plates adapted to be secured to a seat back, for allowing a pivotal movement of said seat back;
   an interlocking shaft for allowing substantially simultaneous pivotal movement of said pair of arm plates relative to said pair of base plates;
   a link plate formed on said interlocking shaft, said link plate having an opening;
   a sound-insulating member attached to said link plate, said sound-insulating member having an opening that has an inside edge, the inside edge of the opening formed in said sound insulating member projecting inwardly with respect to an inside edge defined by said opening of said link plate; and
   a pin for allowing one of said arm plates to pivot by a movement of said pin, said pin being disposed to pass through said opening of said link plate such that said pin is allowed to abut against said inside edge of said opening of said sound-insulating member when said link plate is rotated by said interlocking shaft;

in which, said inside edge of said opening of said sound-insulating member is disposed nearer to said pin than said inside edge of said opening of said link plate.

2. A seat reclining apparatus comprising:

a pair of base plates adapted to be secured to a seat cushion;

a pair of arm plates adapted to be secured to a seat back, for allowing a pivotal movement of said seat back;

an interlocking shaft for allowing essentially simultaneous pivotal movement of said pair of arm plates relative to said pair of base plates;

a link plate formed on said interlocking shaft, said link plate having an opening;

a sound-insulating member attached to said link plate, said sound-insulating member having an opening and an inside edge which projects inwardly with respect to an inside edge of the opening of said link plate; and a pin for allowing one of said arm plates to pivot by a movement of said pin, said pin being disposed to pass through said opening of said link plate such that said pin is allowed to abut against said inside edge of said sound-insulating member when said link plate is rotated by said interlocking shaft; and wherein said sound-insulating member is made of resin.

3. A seat reclining apparatus according to claim 2, wherein said pin projects through an opening of said base plate, said opening of said link plate and said opening of said sound-insulating member.

4. A seat reclining apparatus comprising:

a pair of base plates adapted to be secured to a seat cushion;

a pair of arm plates adapted to be secured to a seat back, for allowing a pivotal movement of said seat back;

an interlocking shaft for allowing essentially simultaneous pivotal movement of said pair of arm plates relative to said pair of base plates;

a link plate formed on said interlocking shaft, said link plate having an opening;

a sound-insulating member attached to said link plate, said sound-insulating member having an opening and an inside edge which projects inwardly with respect to an inside edge of the opening of said link plate; and a pin for allowing one of said arm plates to pivot by a movement of said pin, said pin being disposed to pass through said opening of said link plate such that said pin is allowed to abut against said inside edge of said sound-insulating member when said link plate is rotated by said interlocking shaft; and wherein said opening of said link plate is substantially mated with said opening of said sound-insulating member.

5. A seat reclining apparatus comprising:

a pair of base plates adapted to be secured to a seat cushion;

a pair of arm plates adapted to be secured to a seat back, for allowing a pivotal movement of said seat back;

an interlocking shaft for allowing essentially simultaneous pivotal movement of said pair of arm plates relative to said pair of base plates;

a link plate formed on said interlocking shaft, said link plate having an opening;

a sound-insulating member attached to said link plate, said sound-insulating member having an opening and an inside edge which projects inwardly with respect to an inside edge of the opening of said link plate; and a pin for allowing one of said arm plates to pivot by a movement of said pin, said pin being disposed to pass through said opening of said link plate such that said pin is allowed to abut against said inside edge of said sound-insulating member when said link plate is rotated by said interlocking shaft; and wherein said sound-insulating member is one-piece in construction and has at least a pair of projections formed on a portion adjacent to said inside edge of said sound-insulating member, said projections being inserted through said opening of said link plate to be fitted to said link plate.

6. A seat reclining apparatus, comprising:

a base plate adapted to be secured to a seat cushion;

an arm plate adapted to be secured to a seat back, for allowing a pivotal movement of said seat back;

an interlocking shaft for allowing pivotal movement of said arm plate relative to said base plate;

a link plate formed on said interlocking shaft, said link plate having a first opening;

a sound-insulating member attached to said link plate, said sound-insulating member being formed of a resiliently deformable material and having a second opening which is smaller than the first opening and which overlaps the first opening; and a pin, said pin being rigid with said arm plate and disposed through the first and second openings and arranged to slide along the second opening when said arm plate pivot engages, and resiliently deforms an edge portion of the second opening before engaging an edge portion of the first opening and rotating said link plate.

* * * * *